US009505301B2

(12) United States Patent
Sandou

(10) Patent No.: US 9,505,301 B2
(45) Date of Patent: Nov. 29, 2016

(54) ENGINE DEVICE

(71) Applicant: YANMAR CO., LTD., Osaka (JP)

(72) Inventor: Yoshiyuki Sandou, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/647,630

(22) PCT Filed: Nov. 28, 2013

(86) PCT No.: PCT/JP2013/082069
§ 371 (c)(1),
(2) Date: May 27, 2015

(87) PCT Pub. No.: WO2014/084316
PCT Pub. Date: Jun. 5, 2014

(65) Prior Publication Data
US 2015/0306950 A1 Oct. 29, 2015

(30) Foreign Application Priority Data

Nov. 29, 2012 (JP) .................. 2012-261550

(51) Int. Cl.
*F01N 13/08* (2010.01)
*B60K 13/04* (2006.01)
(Continued)

(52) U.S. Cl.
CPC ............ *B60K 13/04* (2013.01); *E02F 9/0866* (2013.01); *F01N 3/021* (2013.01); *F01N 3/2882* (2013.01); *F01N 13/1822* (2013.01); *F01N 13/1855* (2013.01); *B60Y 2200/412* (2013.01); *E02F 3/3414* (2013.01); *F01N 3/2066* (2013.01); *F01N 13/009* (2014.06); *F01N 13/1805* (2013.01); *F01N 2250/02* (2013.01); *F01N 2340/02* (2013.01); *F01N 2590/08* (2013.01)

(58) Field of Classification Search
CPC ...... F01N 3/021; F01N 3/035; F01N 3/0814; F01N 3/2066; F01N 13/009; F01N 13/1805; F01N 2250/02; F01N 2340/02; F01N 2590/08
USPC .................................. 60/297, 301, 311, 320
See application file for complete search history.

(56) References Cited

U.S. PATENT DOCUMENTS

2010/0186394 A1* 7/2010 Harrison ................. F01N 3/103
60/299
2010/0275587 A1* 11/2010 Schindler ................ F01N 3/021
60/311
(Continued)

FOREIGN PATENT DOCUMENTS

EP 2975235 A2 1/2016
EP 2980382 A1 2/2016
(Continued)

Primary Examiner — Jorge Leon, Jr.
(74) Attorney, Agent, or Firm — Norris, McLaughlin & Marcus, P.A.

(57) ABSTRACT

An engine device in which a first case and a second case can be installed in a compact manner while preventing a decrease of temperature of the first case and the second case due to cooling air for an engine. The engine device is equipped with the first case for removing particulate matter in exhaust gas of the engine, and the second case for removing nitrogen oxide in the exhaust gas of the engine. The first case and the second case are disposed on the upper surface side of the engine at a position higher than an air flow path of a cooling fan of the engine. The second case is disposed at a position higher than the first case.

4 Claims, 23 Drawing Sheets

(51) Int. Cl.
*E02F 9/08* (2006.01)
*F01N 3/28* (2006.01)
*F01N 3/021* (2006.01)
*F01N 13/18* (2010.01)
*F01N 3/20* (2006.01)
*F01N 13/00* (2010.01)
*E02F 3/34* (2006.01)

(56) References Cited

U.S. PATENT DOCUMENTS

2011/0167807 A1* 7/2011 Mitsuda ............... F01N 3/0211
60/311
2011/0167808 A1* 7/2011 Kosaka ............... F01N 13/1822
60/311
2011/0180344 A1* 7/2011 Kimura ................. B60K 13/04
180/309

FOREIGN PATENT DOCUMENTS

| | | |
|---|---|---|
| JP | 2009-074420 | 4/2009 |
| JP | 2010-143452 | 7/2010 |
| JP | 2011-156948 | 8/2011 |
| JP | 2011-163339 | 8/2011 |
| JP | 2012-021505 | 2/2012 |
| JP | 2012-177233 | 9/2012 |
| WO | WO-2011/152306 | 12/2011 |

* cited by examiner

ENGINE DEVICE

TECHNICAL FIELD

The present invention relates to an engine device such as a diesel engine mounted in an agricultural machine (tractor or combine) or a construction machine (bulldozer, power shovel, or loader). More specifically, the present invention relates to an engine device equipped with an exhaust gas purifier for removing particulate matter (such as soot) in exhaust gas, nitrogen oxide (NOx) in the exhaust gas, or the like.

BACKGROUND OF THE INVENTION

Conventionally, there is known a technique for purifying exhaust gas from a diesel engine, in which a case including a diesel particulate filter (hereinafter referred to as a DPF case) and a case including a urea selective reduction catalyst (hereinafter referred to as an SCR case) are disposed as an exhaust gas purifier (exhaust gas post-processing device) in the exhaust path of the diesel engine, and the exhaust gas is guided into the DPF case and the SCR case (see, for example, Patent Documents 1 to 3).

PRIOR ART DOCUMENTS

Patent Document 1: JP-A-2009-74420
Patent Document 2: JP-A-2012-21505
Patent Document 3: JP-A-2012-177233

In the case where the DPF case and the SCR case are mounted away from the engine as described in Patent Document 1 or 2, temperature of the exhaust gas supplied from the engine to the DPF case or the SCR case is decreased, so that a chemical reaction such as reproduction of the diesel particulate filter or selective catalytic reduction is apt to be imperfect. As a result, there is a problem that a special device is necessary for maintaining the temperature of the exhaust gas in the SCR case at a high temperature.

On the other hand, in the case where the DPF case and the SCR case are mounted close to the engine as described in Patent Document 3, the decrease of temperature of the exhaust gas supplied from the engine to the SCR case can be reduced so that the temperature of the exhaust gas in the SCR case can be easily maintained at high temperature. However, there is a problem that it is necessary to secure a space for disposing the SCR case on a side of the engine, so that it is difficult to constitute a compact engine room, and that the DPF case or the SCR case cannot be supported in a compact manner. In addition, there is also a problem that workability of assembling or maintenance of the DPF case or the SCR case cannot be improved because of a small engine room.

Accordingly, it is an object of the present invention to provide an improved engine device by studying these circumstances.

SUMMARY OF THE INVENTION

An engine device includes a first case for removing particulate matter in exhaust gas of an engine, and a second case for removing nitrogen oxide in the exhaust gas of the engine. The first case and the second case are disposed on the upper surface side of the engine. The first case and the second case are disposed at a position higher than an air flow path of a cooling fan for the engine. The second case is disposed at a position higher than the first case.

An engine device is configured in such a manner that the second case is disposed at a position higher than the upper surface of a cooling fan shroud of the engine, and the second case is disposed just above the cooling fan.

An engine device is configured in such a manner that a case bracket is disposed to stand on the upper surface side of the engine, and the first case is attached to the case bracket, so that a cooling fan airflow is guided to the upper surface side of the engine by an engine cooling air guiding action of the case bracket.

An engine device is configured in such a manner that a radiator is disposed in front of the cooling fan, and the first case is attached to the upper surface side of the engine, so that the second case is supported on a machine frame side on which the radiator is disposed.

According to the engine device, the first case for removing particulate matter in exhaust gas of the engine and the second case for removing nitrogen oxide in the exhaust gas of the engine are disposed on the upper surface side of the engine, the first case and the second case are disposed at a position higher than an air flow path of a cooling fan of the engine, and the second case is disposed at a position higher than the first case. Accordingly, a decrease of temperature of the first case and the second case due to the cooling air for the engine can be reduced while a distance between the first case main body and the second case main body can be easily reduced so that the first case and the second case can be disposed in a compact manner. The first case and the second case can be connected to an exhaust manifold of the engine with a short distance so that at crystallization in the second case can be reduced.

According to the engine device, because of the structure in which the second case is disposed at a position higher than the upper surface of the cooling fan shroud of the engine, and the second case is disposed just above the cooling fan, the second case can be supported apart from the cooling air path of the cooling fan so that a decrease of temperature of each case can be reduced, while the first case and the second case can be disposed in a compact manner biased to the upper surface on which the cooling fan is disposed in the upper surface of the engine.

According to the engine device, the case bracket is disposed to stand on the upper surface side of the engine, and the first case is attached to the case bracket, so that a cooling fan airflow is guided to move to the upper surface side of the engine by an engine cooling air guiding action of the case bracket. Accordingly, the cooling fan airflow can appropriately cool the upper surface side of the engine so that an overheat (output loss) of the engine can be reduced, while the first case and the second case can be disposed in a compact manner biased to the upper surface on which the cooling fan is disposed in the upper surface of the engine, so that a decrease of temperature of each case can be reduced.

According to the engine device, the radiator is disposed in front of the cooling fan, and the first case is attached to the upper surface side of the engine, so that the second case is supported on a machine frame side on which the radiator is disposed. Accordingly, the first case and the second case can be disposed in a compact manner biased to the upper surface on which the cooling fan is disposed in the upper surface of the engine, while an attaching/detaching operation of the first case and an attaching/detaching operation of the second case can be performed independently so that assembling workability of each case necessitating a suspending operation by a mechanism such as a hoist can be improved.

DETAILED DESCRIPTION OF THE PREFERRED EMBODIMENTS

Figure 1:
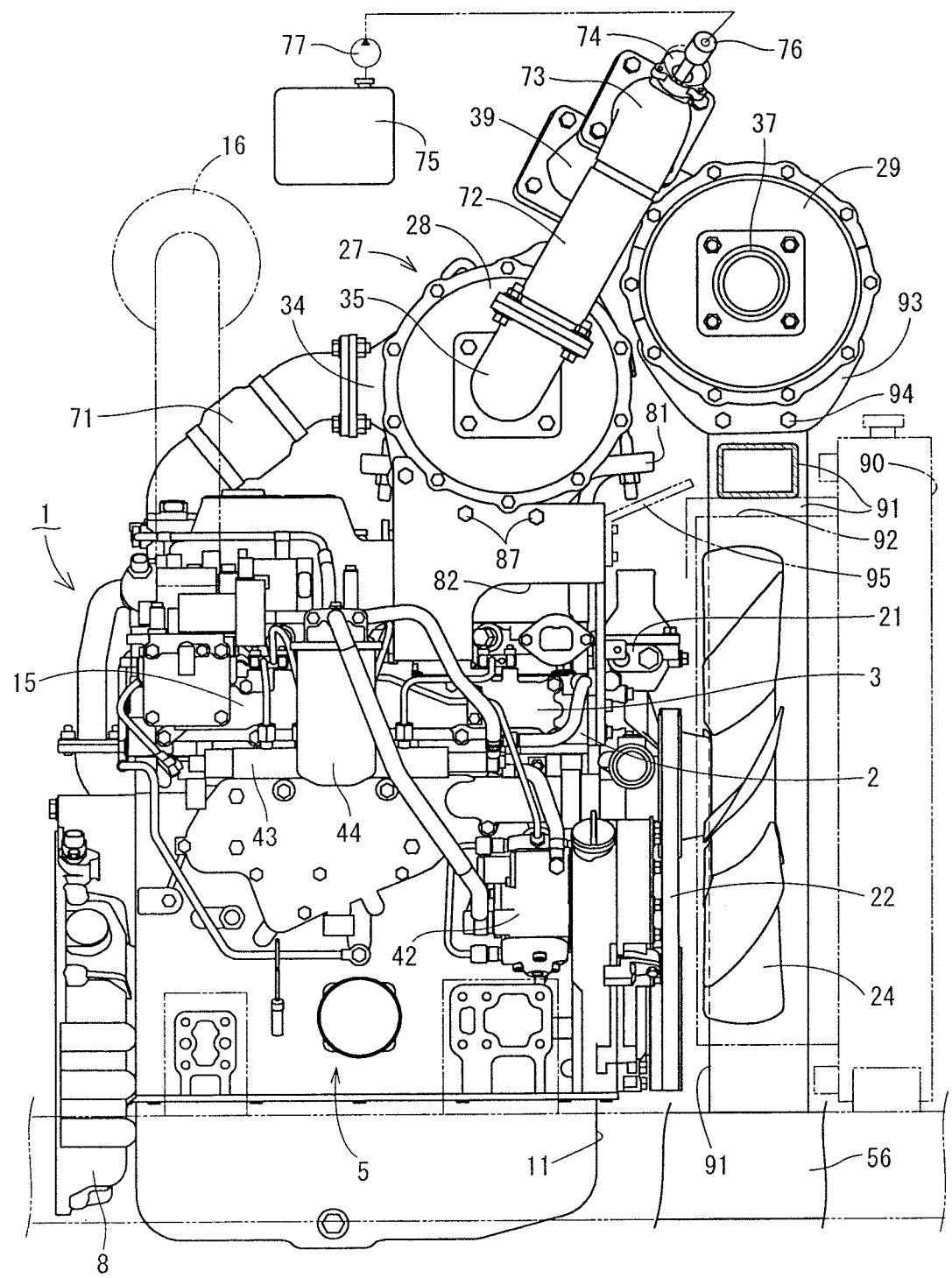
FIG. 1 is a front view of a diesel engine of a first embodiment.
Figure 2:
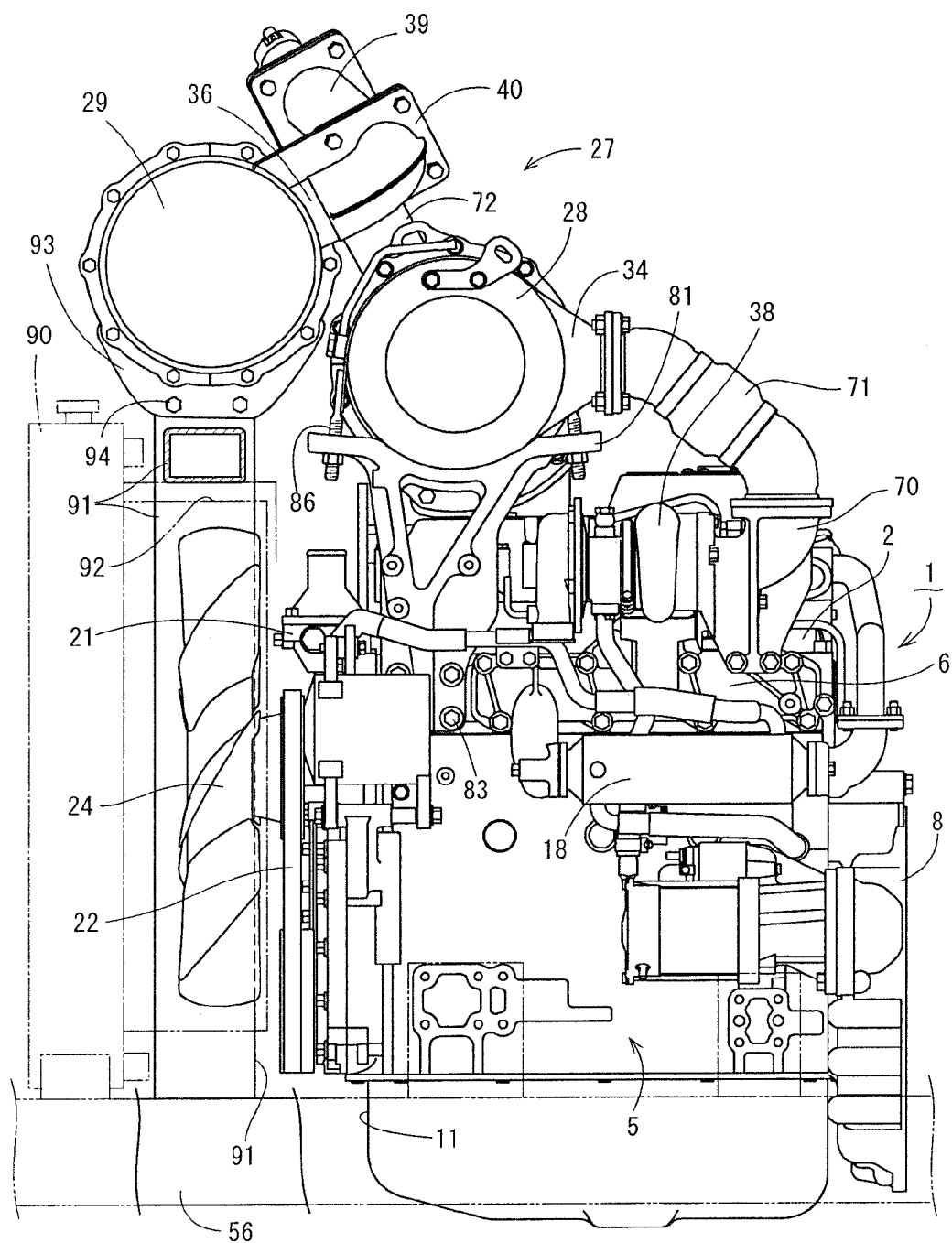
FIG. 2 is a rear view of the diesel engine.
Figure 3:
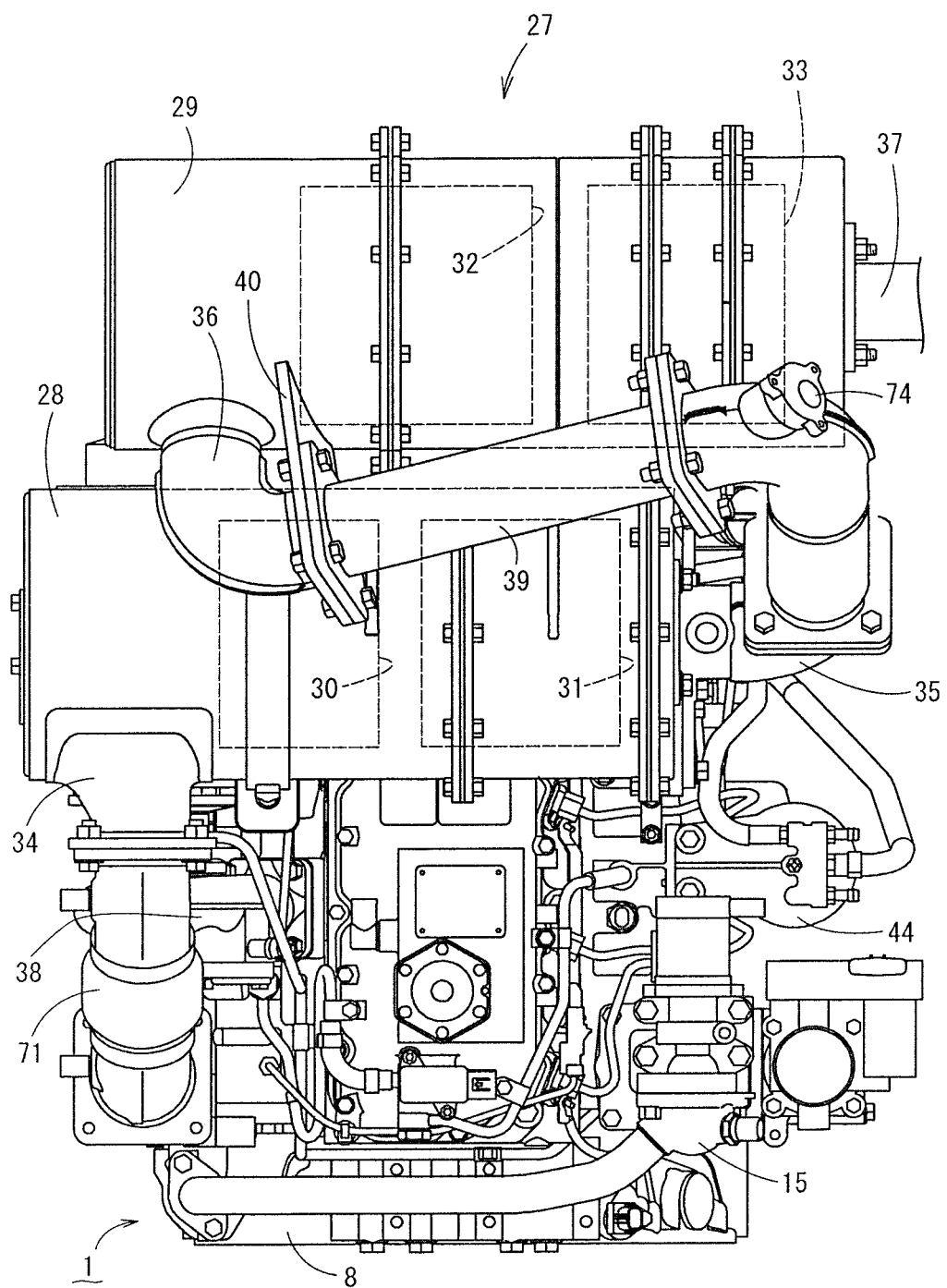
FIG. 3 is a plan view of the diesel engine.
Figure 4:
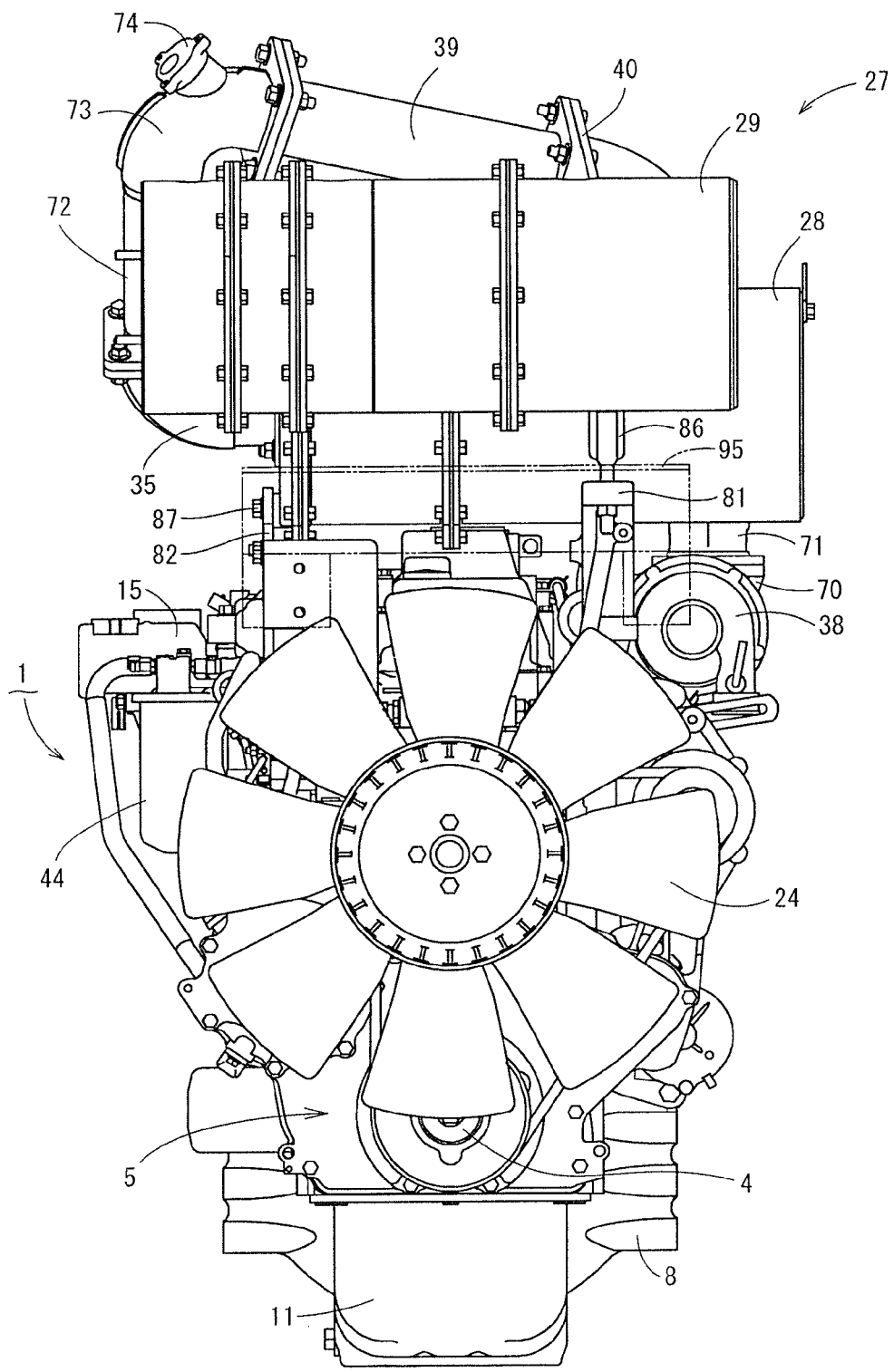
FIG. 4 is a left side view of the diesel engine.
Figure 5:
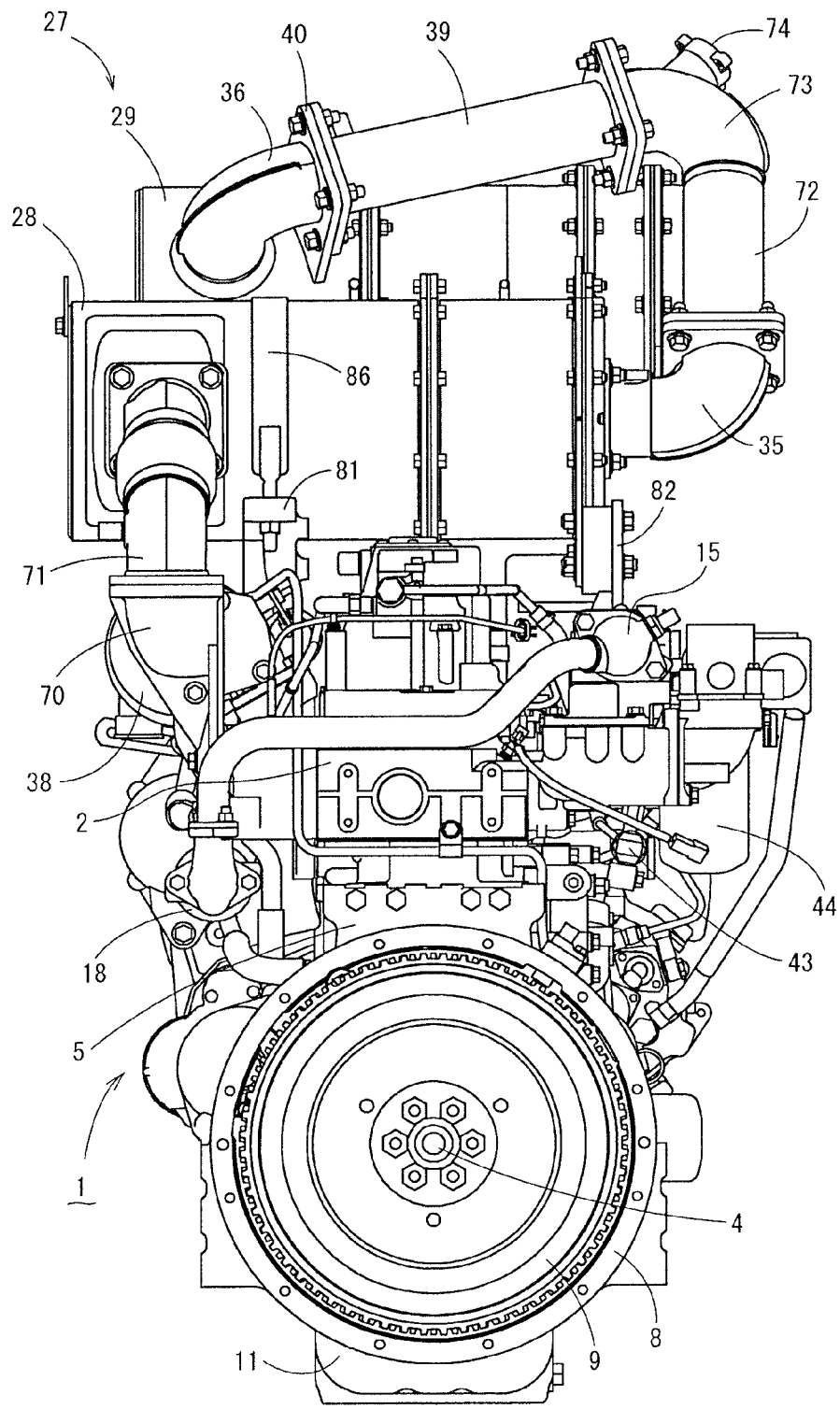
FIG. 5 is a right side view of the diesel engine.
Figure 6:
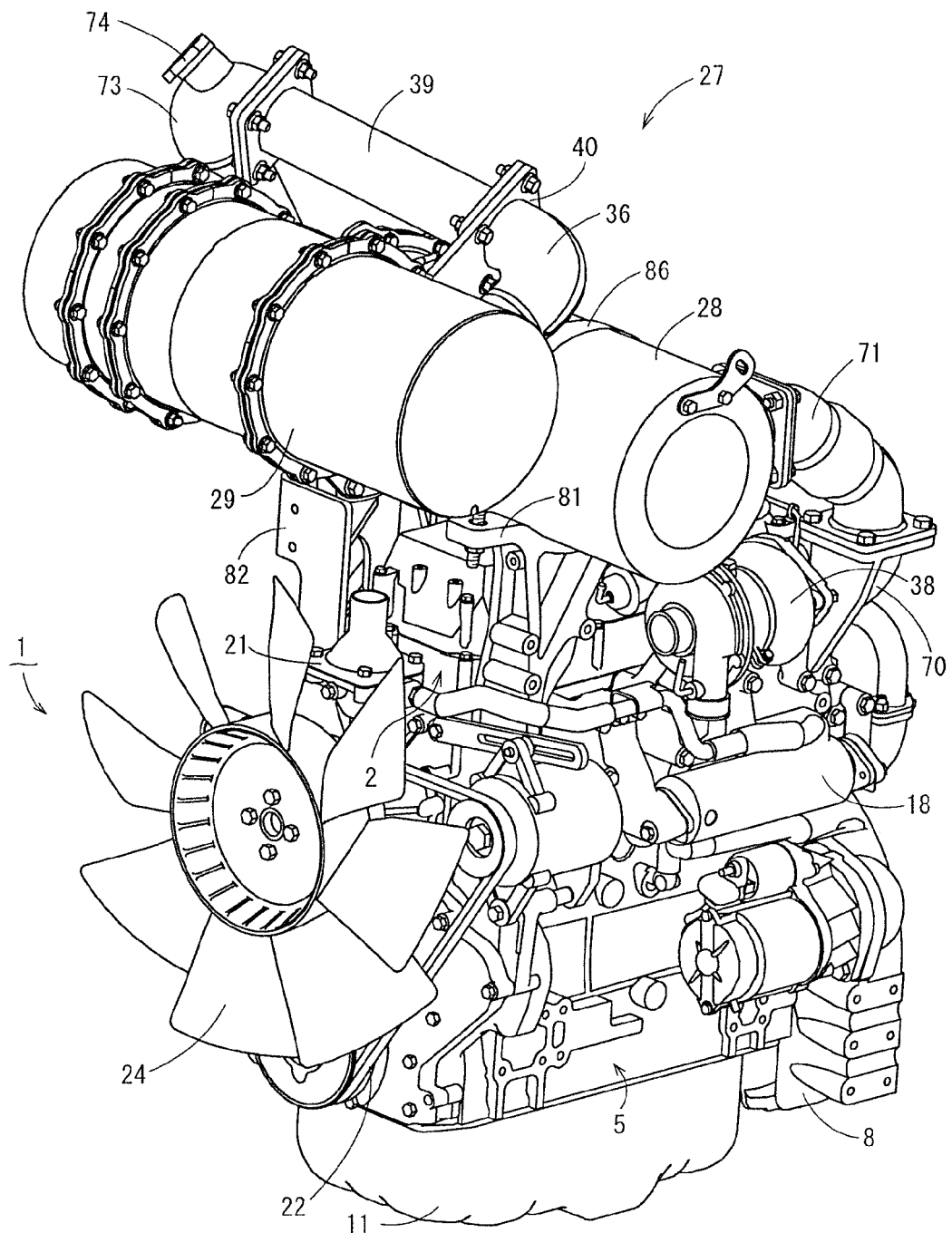
FIG. 6 is a left side perspective view of the diesel engine.
Figure 7:
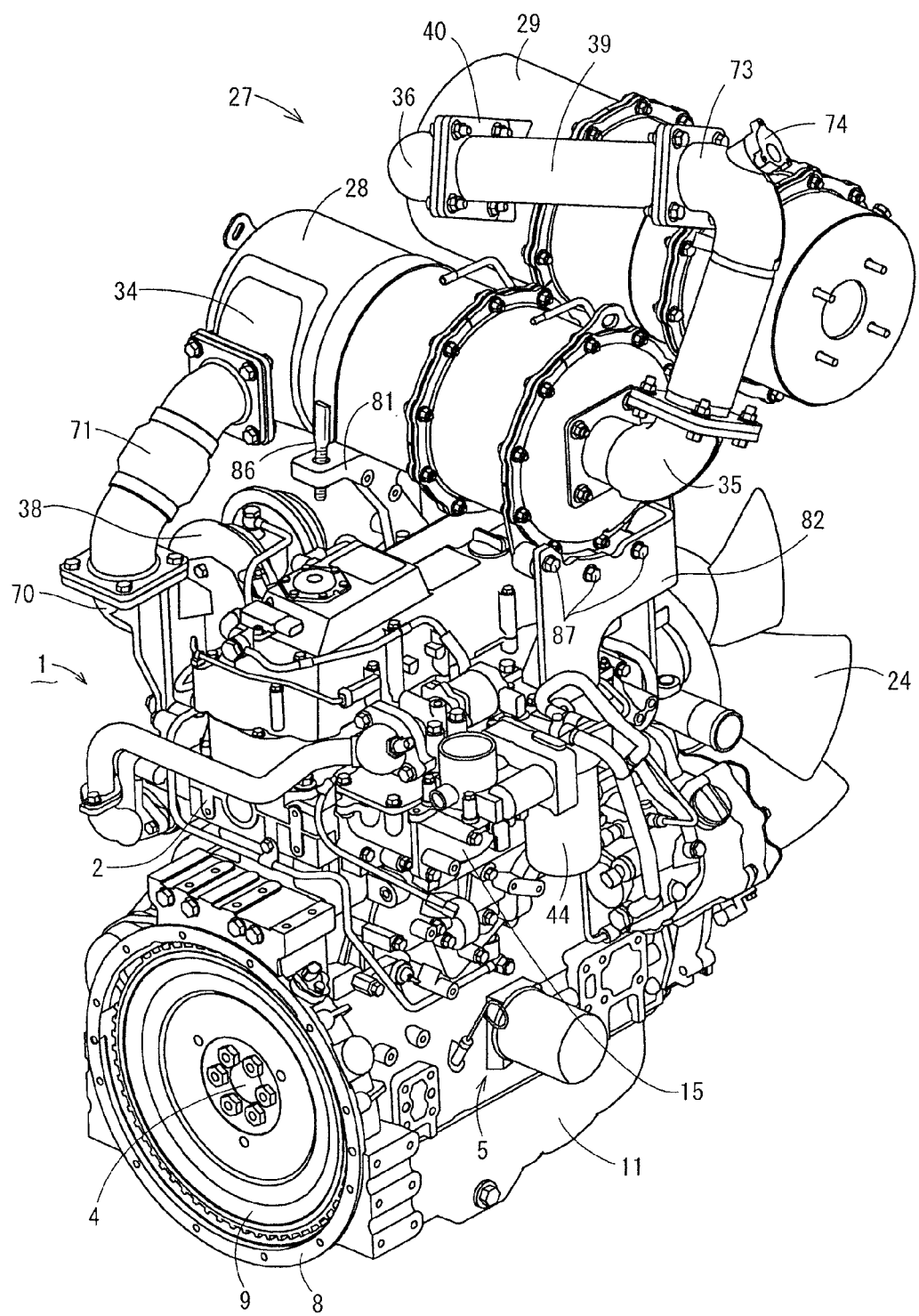
FIG. 7 is a right side perspective view of the diesel engine.

Hereinafter, an embodiment of the present invention is described with reference to the drawings. FIG. 1 is a front view of a diesel engine with an intake manifold, FIG. 2 is a rear view of the diesel engine with the exhaust manifold, FIG. 3 is a plan view of the diesel engine, FIG. 4 is a left side view of the diesel engine with a cooling fan, FIG. 5 is a right side view of the diesel engine with a flywheel, and FIGS. 6 and 7 are perspective views of the diesel engine. With reference to FIGS. 1 to 7, an overall structure of the diesel engine 1 is described.

As shown in FIGS. 1 to 7, an intake manifold 3 is disposed on one side of a cylinder head 2 of the diesel engine 1. The cylinder head 2 is placed on a cylinder block 5 in which an engine output shaft 4 (crank shaft) and a piston (not shown) are housed. An exhaust manifold 6 is disposed on the other side of the cylinder head 2. A front end and a rear end of the engine output shaft 4 protrude from a front face and a rear face of the cylinder block 5.

As shown in FIGS. 1 to 7, a flywheel housing 8 is fixed to the rear face of the cylinder block 5. A flywheel 9 is disposed in the flywheel housing 8. The flywheel 9 is connected to the rear end of the engine output shaft 4. A driving force of the diesel engine 1 is output via the flywheel 9. Further, an oil pan 11 is disposed on the underside of the cylinder block 5.

As shown in FIGS. 1 and 3, the intake manifold 3 is provided with an exhaust gas recirculation system (EGR) 15 for taking in exhaust gas for recirculation. The intake manifold 3 is connected to an air cleaner 16. External air after dust-removal and purification by the air cleaner 16 is sent to the intake manifold 3 and is supplied to each cylinder of the diesel engine 1.

With the structure described above, a part of the exhaust gas exhausted from diesel engine 1 to the exhaust manifold 6 is returned to each cylinder of the diesel engine 1 from the intake manifold 3 via the exhaust gas recirculation system 15. Thus, combustion temperature of the diesel engine 1 is decreased, discharge of nitrogen oxide (NOx) from the diesel engine 1 is reduced, and fuel consumption of the diesel engine 1 is improved.

Note that a cooling water pump 21 is disposed for circulating cooling water in the cylinder block 5 and a radiator (not shown). The cooling water pump 21 is disposed on the side of the diesel engine 1 on which a cooling fan 24 is disposed. The engine output shaft 4 is connected to the cooling water pump 21 and the cooling fan 24 via a V-belt 22 or the like, so as to drive the cooling water pump 21 and the cooling fan 24. The cooling water is supplied into the cylinder block 5 from the cooling water pump 21 via an EGR cooler 18 of the exhaust gas recirculation system 15, while an air flow from the cooling fan 24 cools the diesel engine 1.

As shown in FIGS. 1 to 7, as an exhaust gas purifier 27 for purifying the exhaust gas exhausted from each cylinder of the diesel engine 1, there are disposed a first case 28 as a diesel particulate filter (DPF) for removing particulate matter in the exhaust gas from the diesel engine 1 and a second case 29 as a urea selective catalytic reduction (SCR) system for removing nitrogen oxide in the exhaust gas from the diesel engine 1. As shown in FIG. 3, an oxidation catalyst 30 and a soot filter 31 are disposed in the first case 28. An SCR catalyst 32 and an oxidation catalyst 33 for urea selective catalytic reduction are disposed in the second case 29.

The exhaust gas exhausted from each cylinder of the diesel engine 1 to the exhaust manifold 6 is discharged externally via the exhaust gas purifier 27 and the like. The exhaust gas purifier 27 reduces carbon monoxide (CO), hydrocarbon (HC), particulate matter (PM), and nitrogen oxide (NOx) in the exhaust gas from the diesel engine 1.

The first case 28 and the second case 29 have a substantially cylindrical shape elongated in the horizontal direction perpendicular to the output shaft (crank shaft) 4 of the diesel engine 1 in a plan view. On both sides of the first case 28 (on one side and the other side in an exhaust gas moving direction), there are disposed a DPF inlet tube 34 for taking in the exhaust gas and a DPF outlet tube 35 for exhausting the exhaust gas. Similarly, on both sides of the second case 29 (on one side and the other side in the exhaust gas moving direction), there are disposed a SCR inlet tube 36 for taking in the exhaust gas and a SCR outlet tube 37 for exhausting the exhaust gas.

In addition, a supercharger 38 for forcibly supplying air to the diesel engine 1 is disposed at an exhaust gas outlet of the exhaust manifold 6. The exhaust manifold 6 communicates to the DPF inlet tube 34 via the supercharger 38 so that the exhaust gas from the diesel engine 1 is guided into the first case 28, while the DPF outlet tube 35 is connected to the SCR inlet tube 36 via a connection pipe 39 so that the exhaust gas from the first case 28 is guided into the second case 29. Note that a proximal end of a pipe support bracket 40 is fixed to the outer circumference surface of the second case 29, and a distal end of the pipe support bracket 40 is connected to an end portion of the connection pipe 39 combined to the SCR inlet tube 36, so that the connection pipe 39 is supported by the second case 29 via the pipe support bracket 40 in a detachable manner.

As shown in FIG. 1, each of injectors (not shown) of the cylinders of the diesel engine 1 is provided with a fuel pump 42 for connecting a fuel tank (not shown) and a common rail 43. The common rail 43 and a fuel filter 44 is disposed on the side of the cylinder head 2 on which the intake manifold 3 is disposed, and the fuel pump 42 is disposed on the cylinder block 5 below the intake manifold 3. Note that each injector is equipped with an electromagnetic switch control type of fuel injection valve (not shown).

Fuel in the fuel tank (not shown) is sucked into the fuel pump 42 via the fuel filter 44, while the common rail 43 is connected to a discharge side of the fuel pump 42, and the cylindrical common rail 43 is connected to each injector of the diesel engine 1.

With the structure described above, fuel in the fuel tank is sent with pressure by the fuel pump 42 to the common rail 43 so that high pressure fuel is stored in the common rail 43, while the fuel injection valve of each injector is controlled to open and close so that the high pressure fuel in the common rail 43 is injected into each cylinder of the diesel engine 1. In other words, the fuel injection valve of each injector is electronically controlled so that injection pressure, injection timing, and injection period (injection amount) of the fuel can be precisely controlled. Accordingly, nitrogen oxide (NOx) exhausted from the diesel engine 1 can be reduced.

Figure 8:
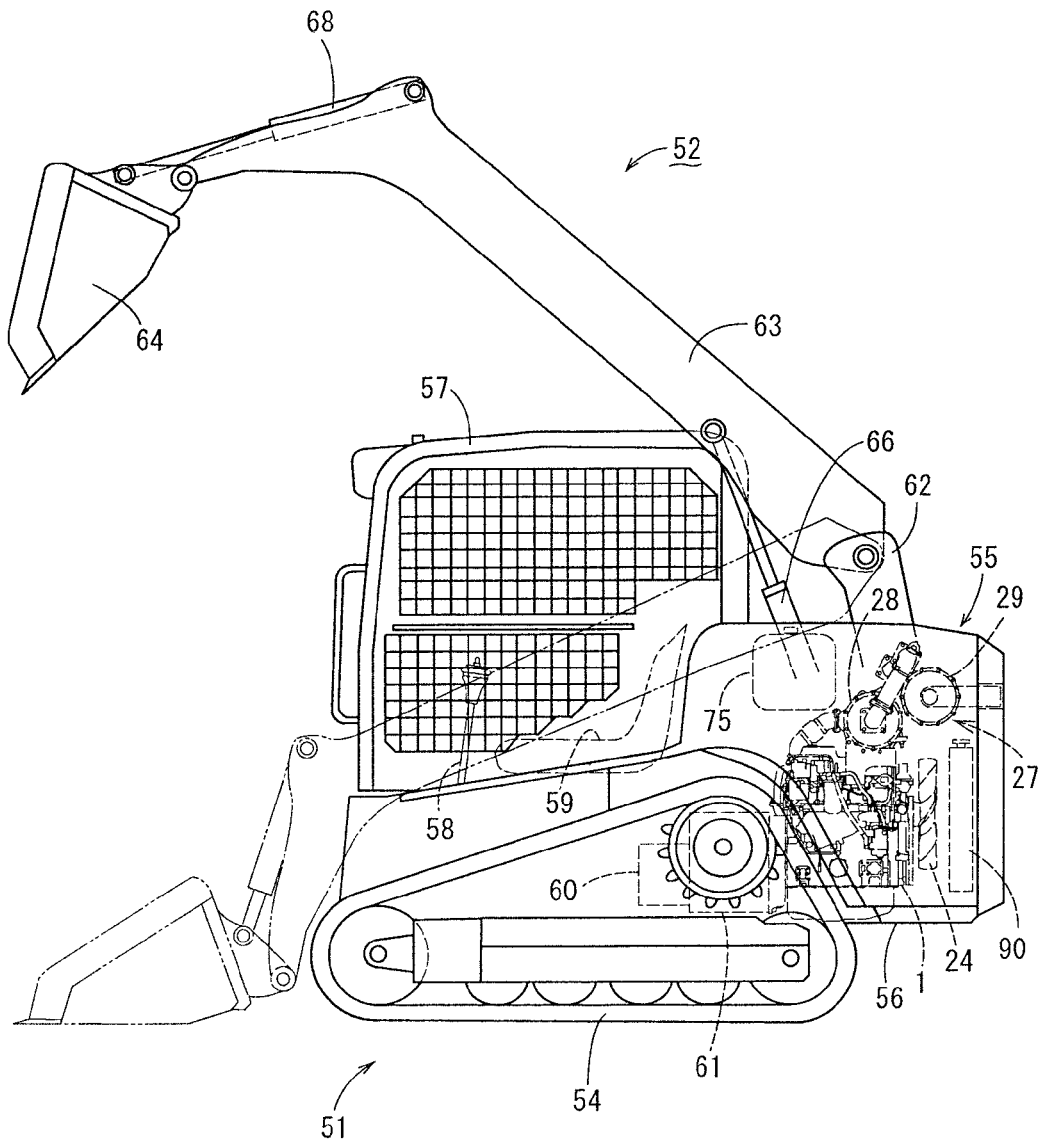
FIG. 8 is a side view of a work vehicle in which the diesel engine is mounted.
Figure 9:
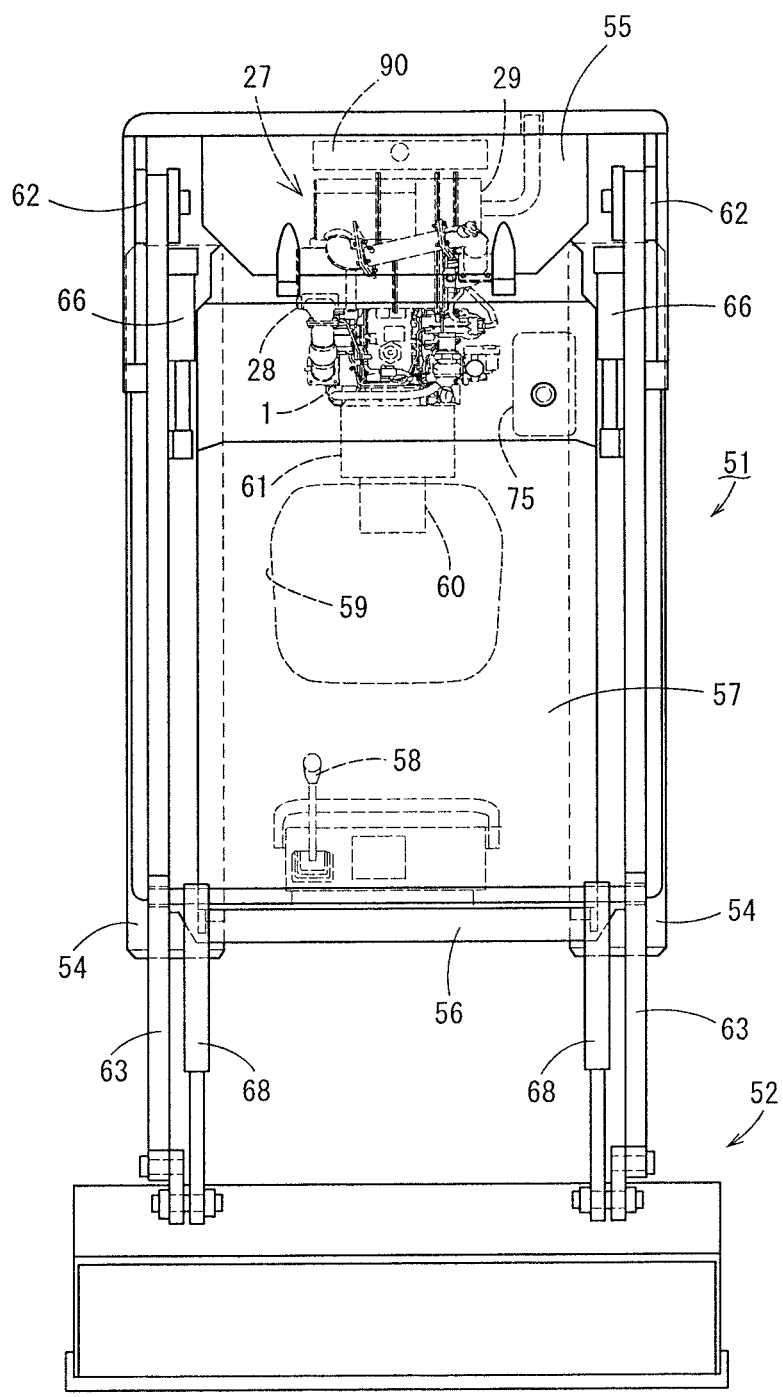
FIG. 9 is a plan view of the work vehicle.
Figure 10:
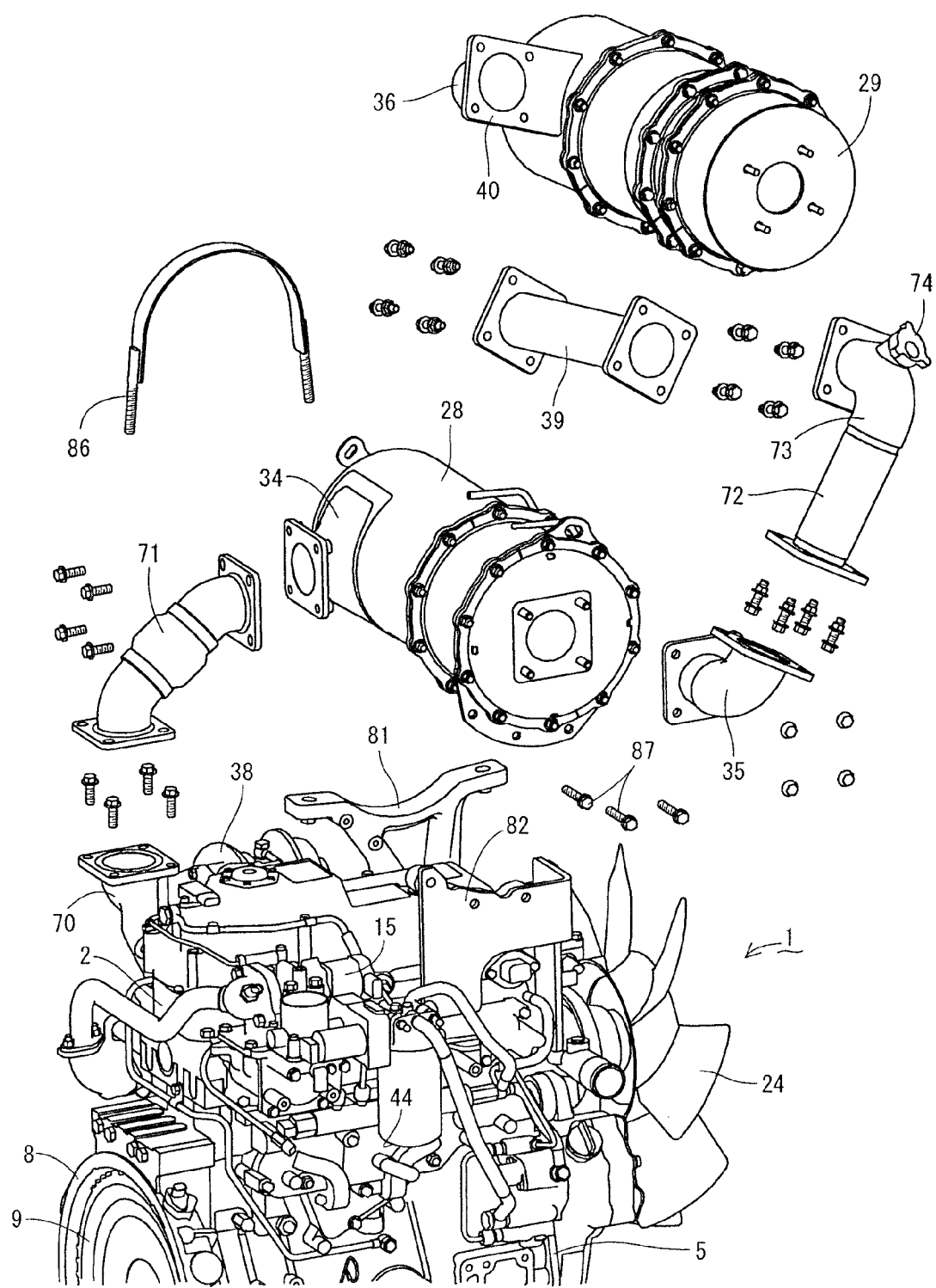
FIG. 10 is a perspective view of an attachment part of an exhaust gas purifier.

Next, with reference to FIGS. 8 and 9, a skid steer loader 51 in which the diesel engine 1 is mounted is described. The skid steer loader 51 as a work vehicle shown in FIGS. 8 and 9 is equipped with a loader device 52 that will be described later so as to perform loading work. This skid steer loader 51 is equipped with left and right traveling crawlers 54. In addition, an openable and closable bonnet 55 is placed above the traveling crawlers 54 of the skid steer loader 51.

The diesel engine 1 is housed in the bonnet 55. This diesel engine 1 is supported by a traveling machine body 56 of the skid steer loader 51 via a vibration isolating member and the like. A cabin 57 in which an operator sits is placed in front of the bonnet 55, and an operating handle 58, an operator's seat 59, and the like are disposed in the cabin 57. In addition, a loading work hydraulic pump device 60 driven by the diesel engine 1 and a traveling mission device 61 for driving the left and right traveling crawlers 54 are disposed. Driving force of the diesel engine 1 is transmitted to the left and right traveling crawlers 54 via the traveling mission device 61. The operator sitting in the operator's seat 59 can drive and control the skid steer loader 51 with an operating portion such as the operating handle 58.

In addition, the loader device 52 includes loader posts 62 positioned on the left and right sides of the traveling machine body 56, a pair of left and right lift arms 63 respectively connected to upper ends of the loader posts 62 in a vertically rockable manner, and a bucket 64 connected to distal end portions of the left and right lift arms 63 in a vertically rockable manner.

A lift cylinder 66 for vertically rocking the lift arm 63 is disposed between each loader post 62 and the corresponding lift arm 63. A bucket cylinder 68 for vertically rocking the bucket 64 is disposed between each of the left and right lift arms 63 and the bucket 64. In this case, when the operator in the operator's seat 59 operates a loader lever (not shown), oil pressure of the loading work hydraulic pump device 60 is controlled so that the lift cylinder 66 and the bucket cylinder 68 are driven to expand and contract. Thus, the lift arm 63 and the bucket 64 are vertically rocked so that the loading work is performed.

Figure 11:
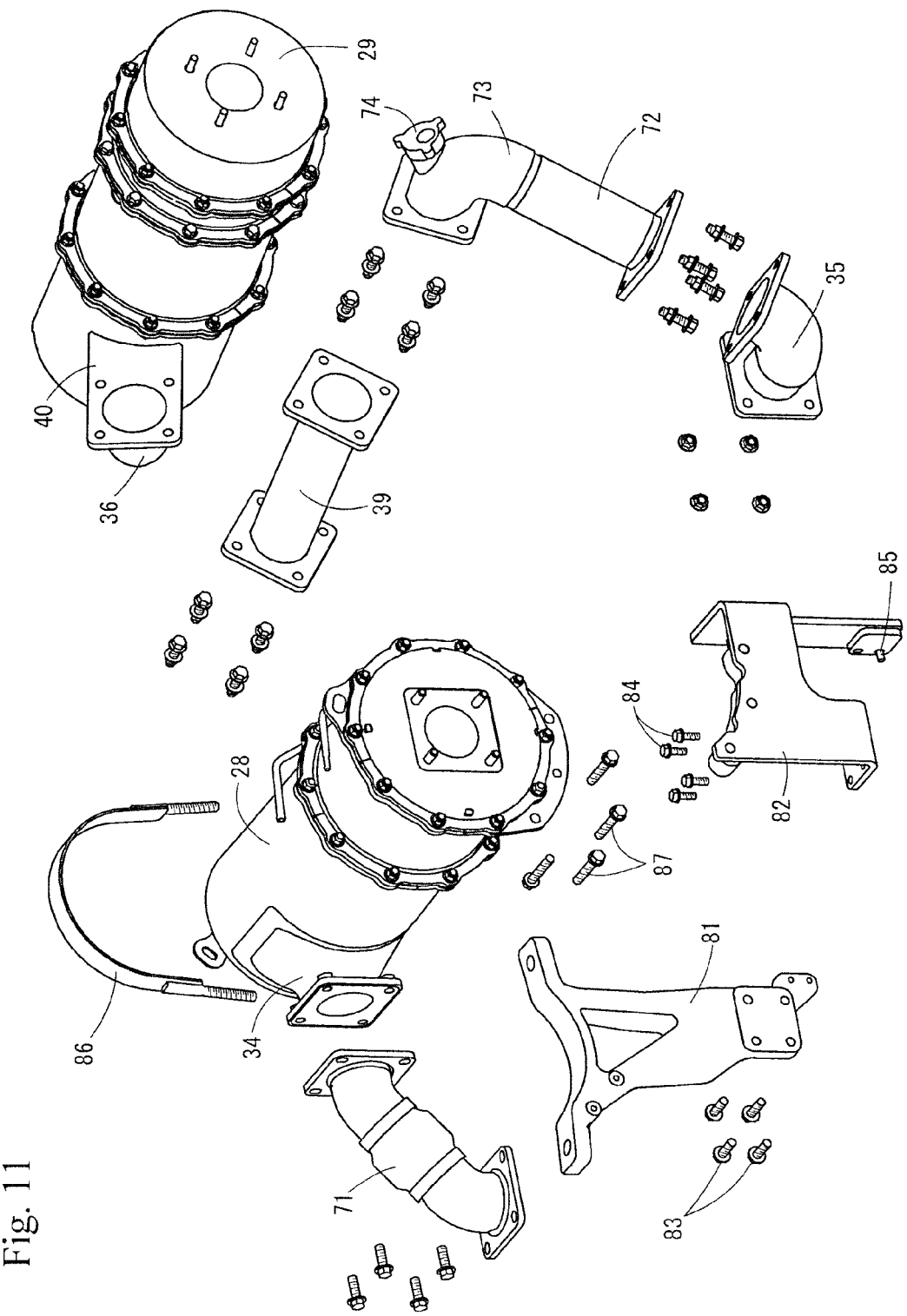
FIG. 11 is an exploded perspective view of the exhaust gas purifier.
Figure 12:
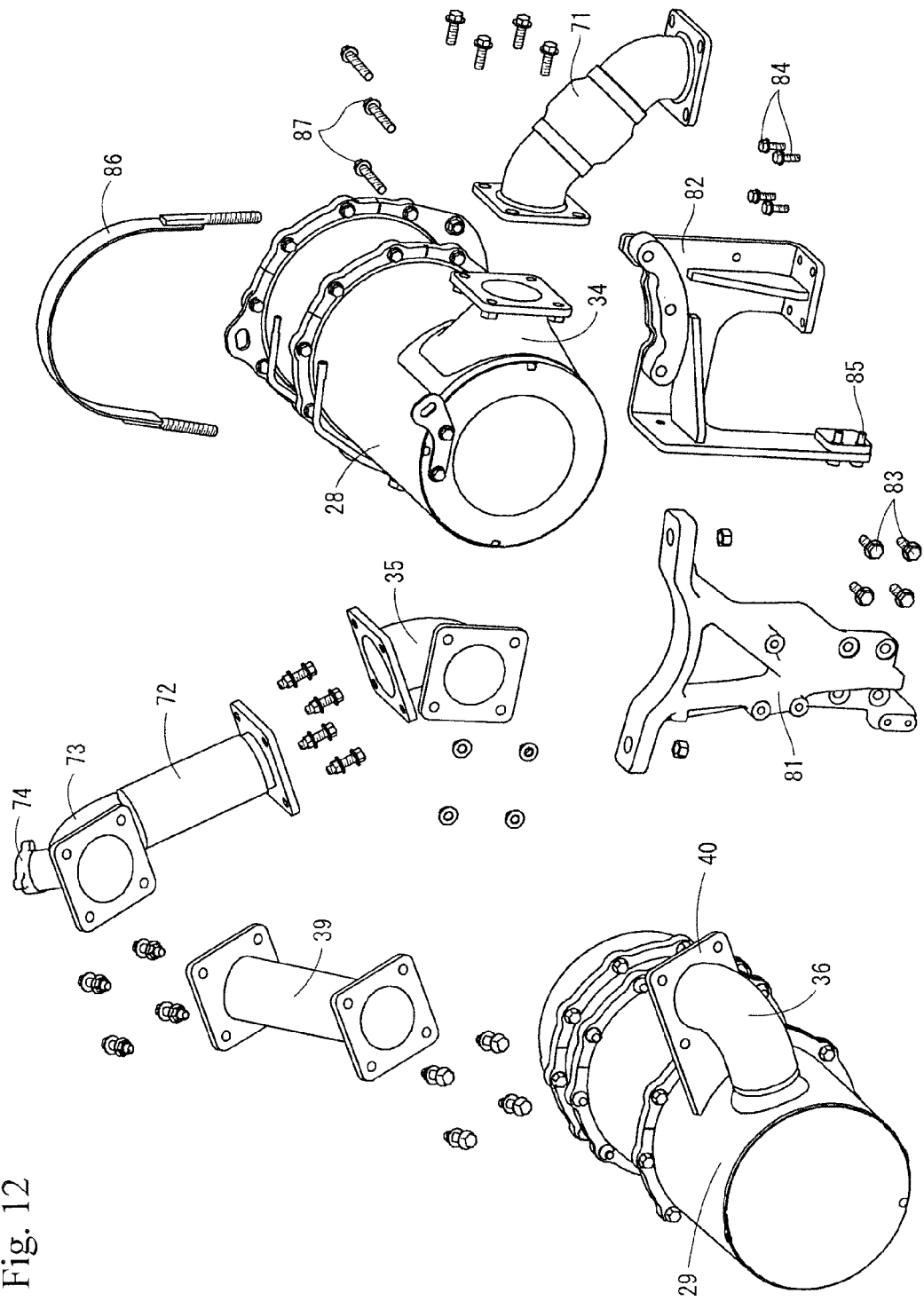
FIG. 12 is an exploded perspective view of the exhaust gas purifier.
Figure 13:
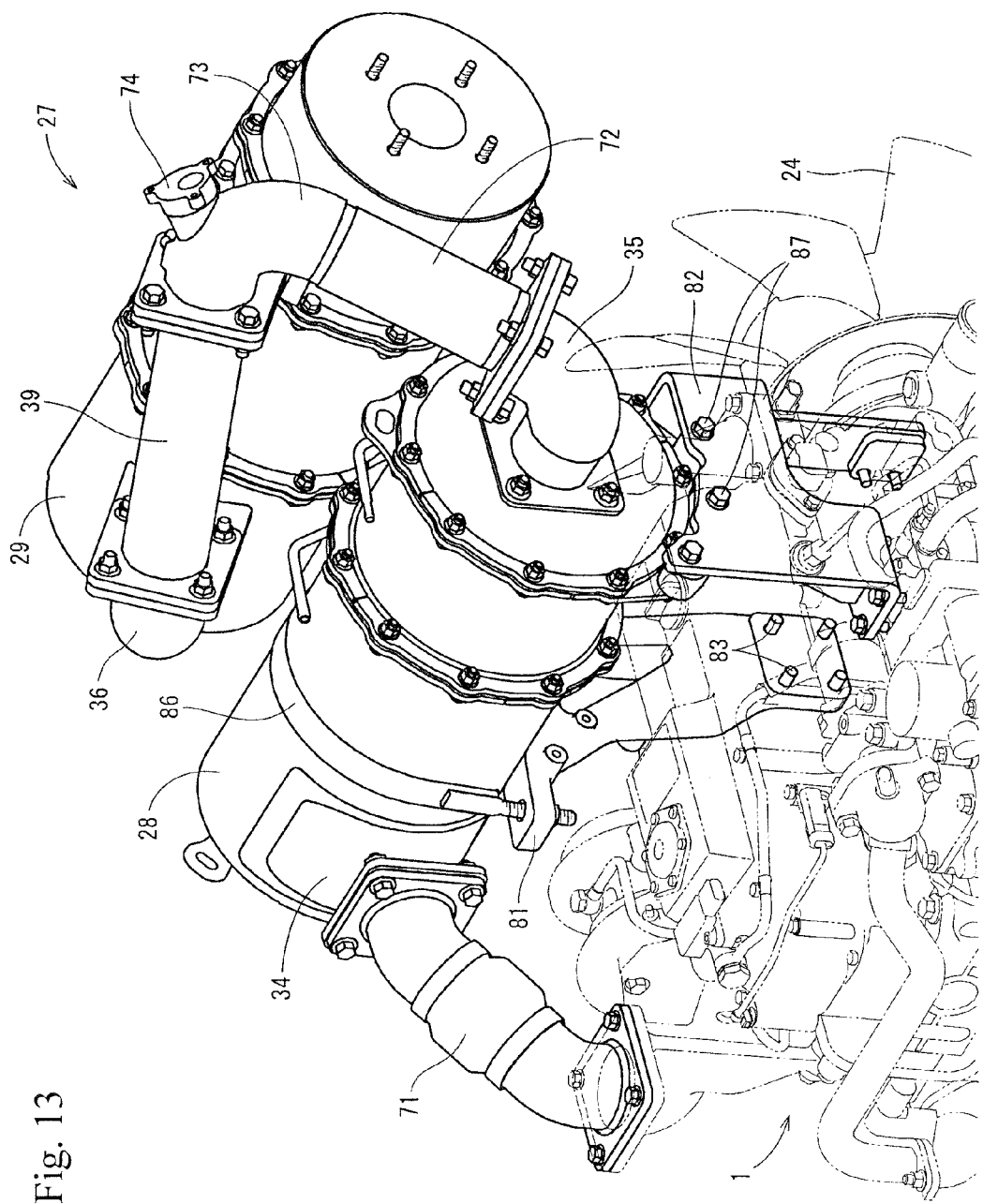
FIG. 13 is an assembly explanatory diagram of the exhaust gas purifier.
Figure 14:
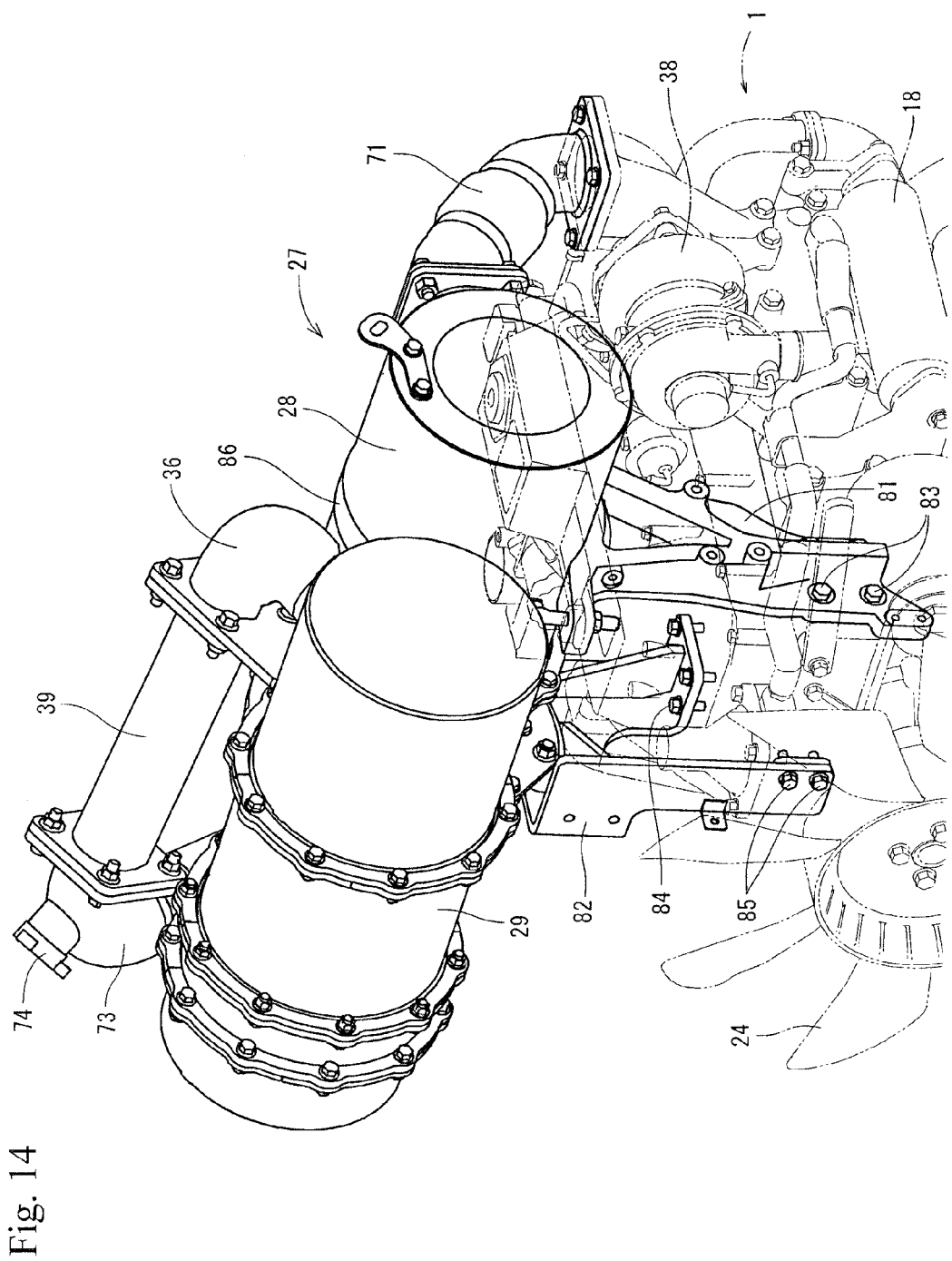
FIG. 14 is an assembly explanatory diagram of the exhaust gas purifier.
Figure 15:
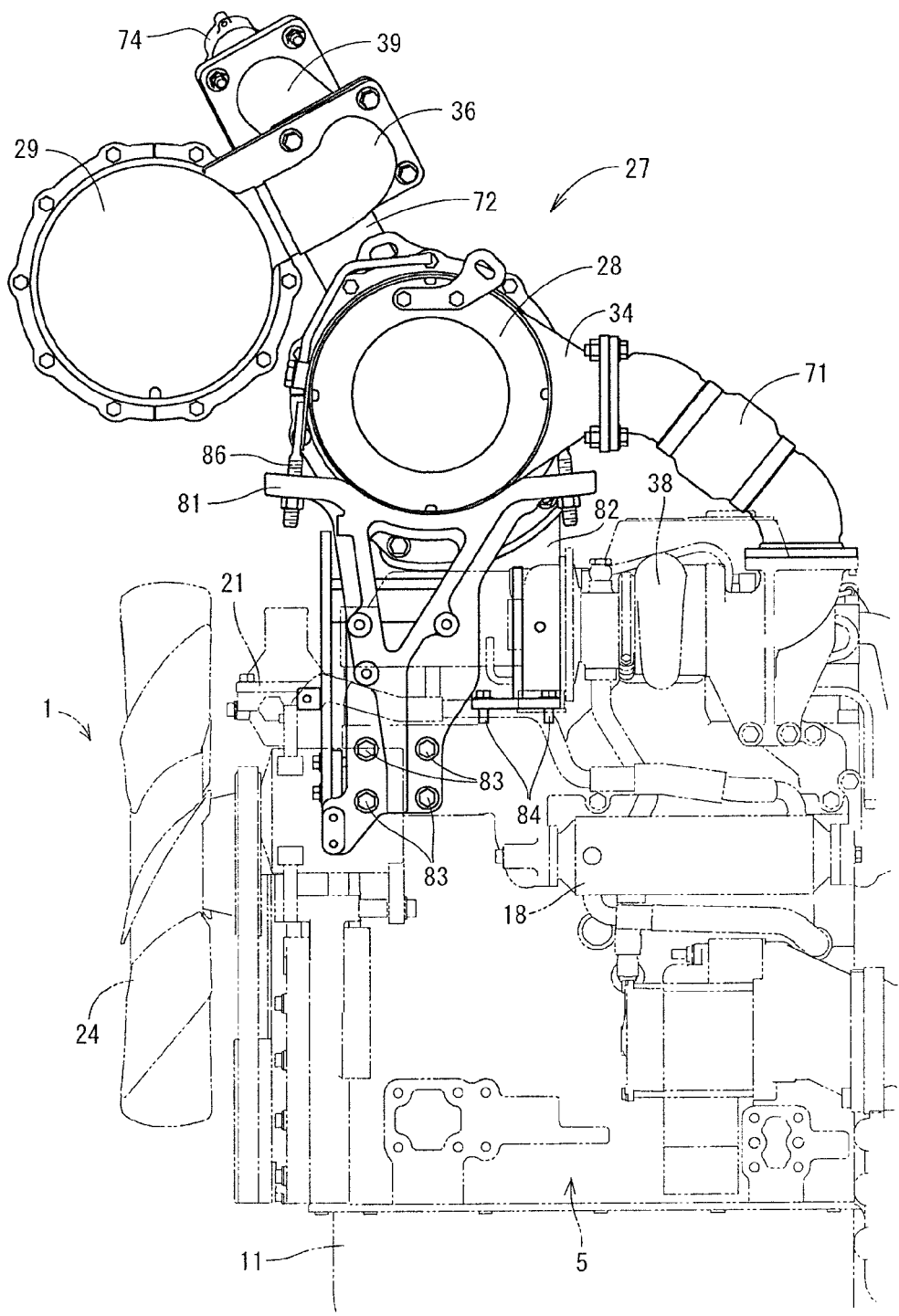
FIG. 15 is an assembly explanatory diagram of the exhaust gas purifier.
Figure 16:
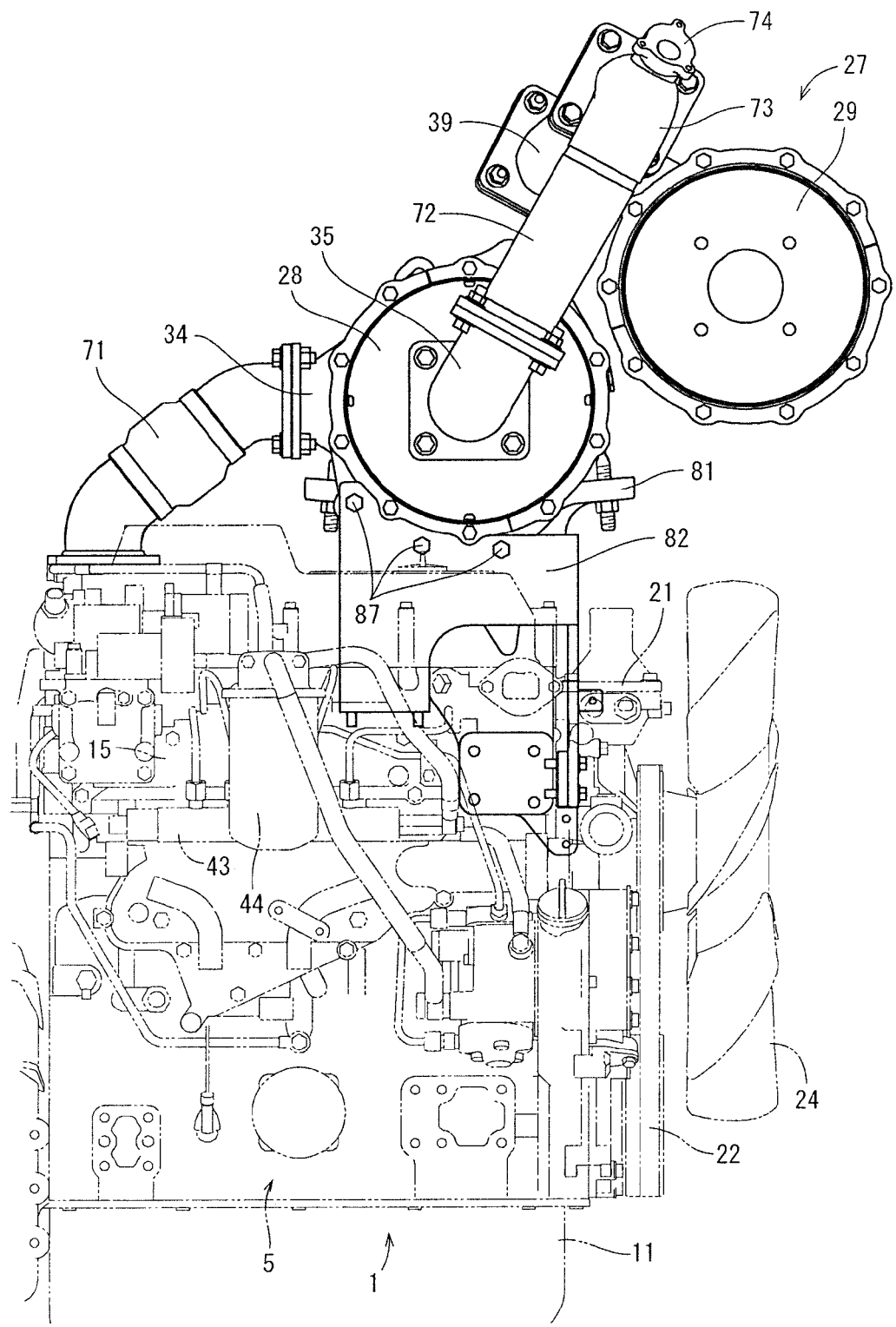
FIG. 16 is an assembly explanatory diagram of the exhaust gas purifier.
Figure 17:
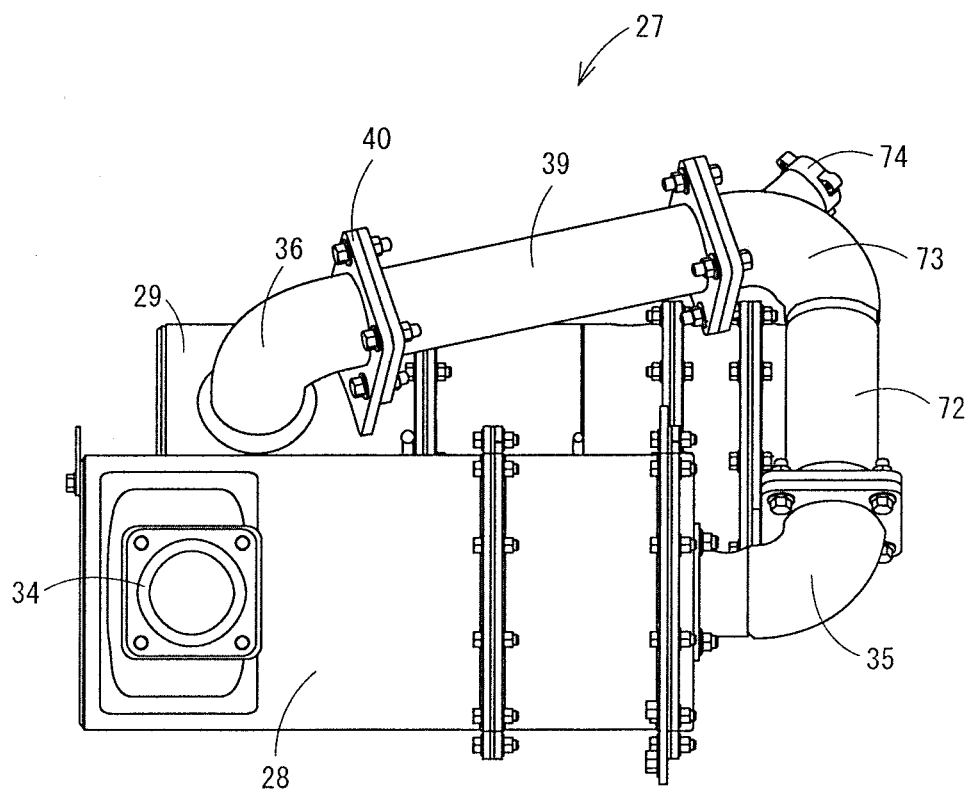
FIG. 17 is a front view of the exhaust gas purifier.
Figure 18:
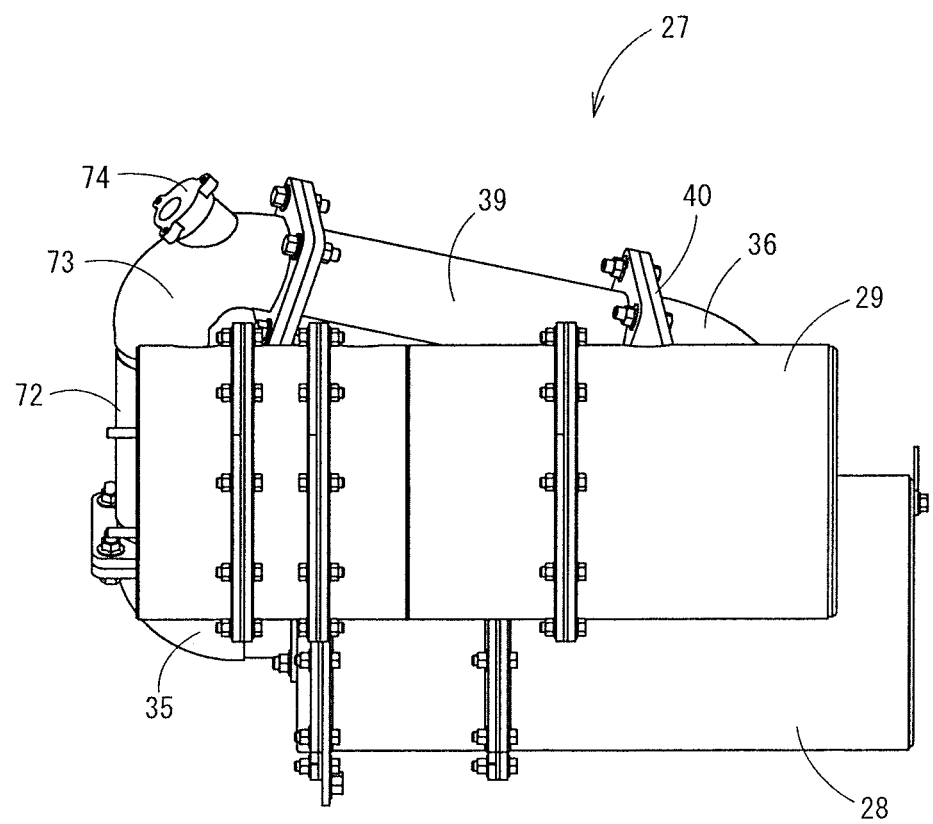
FIG. 18 is a rear view of the exhaust gas purifier.
Figure 19:
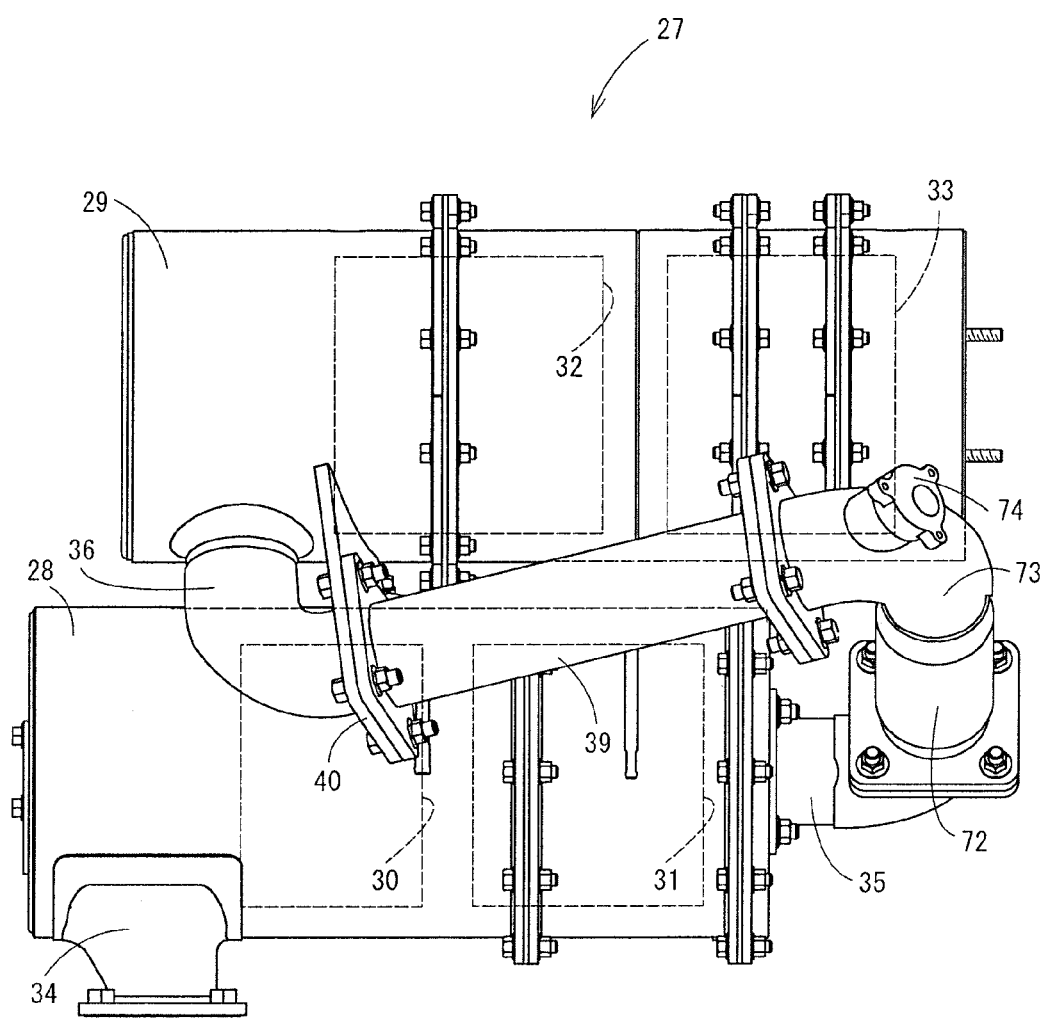
FIG. 19 is a plan view of the exhaust gas purifier.
Figure 20:
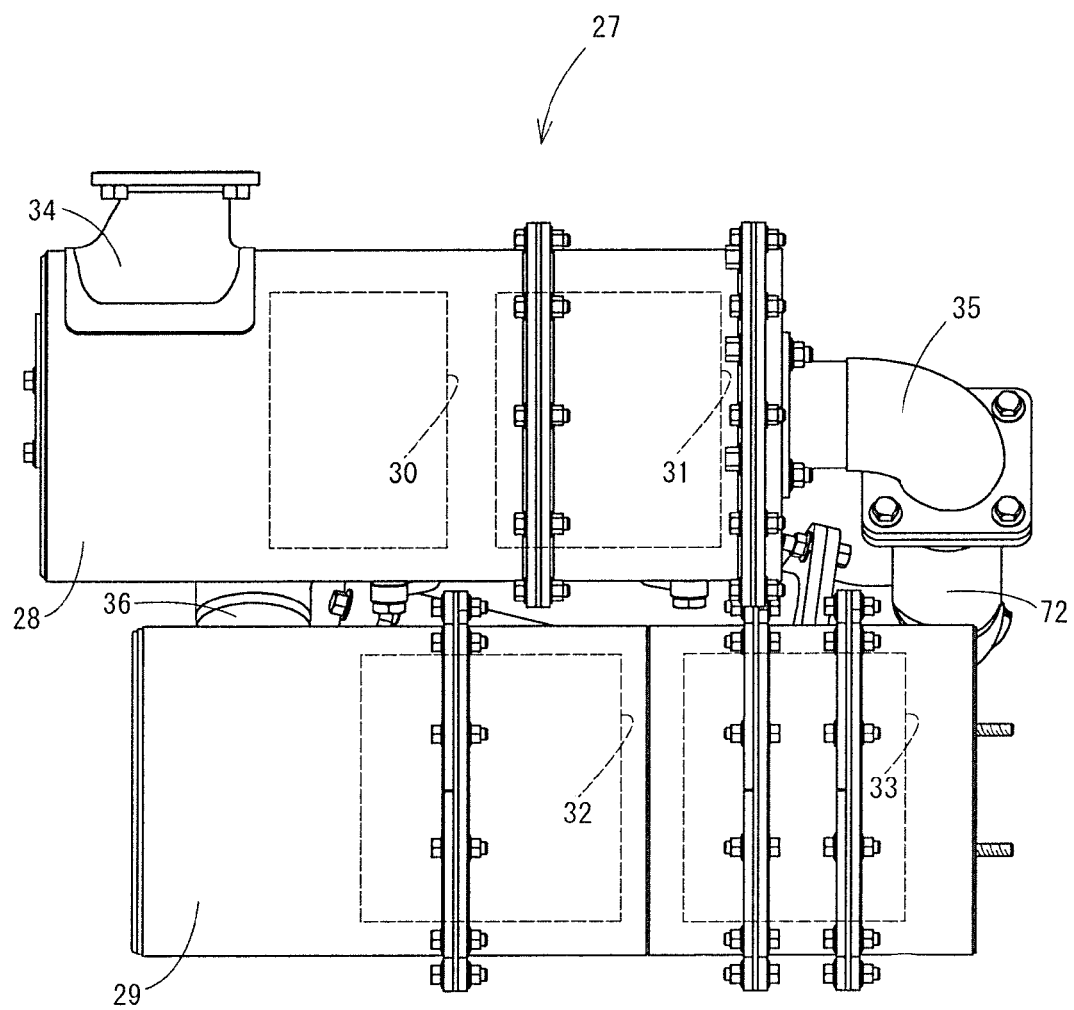
FIG. 20 is a bottom view of the exhaust gas purifier.
Figure 21:
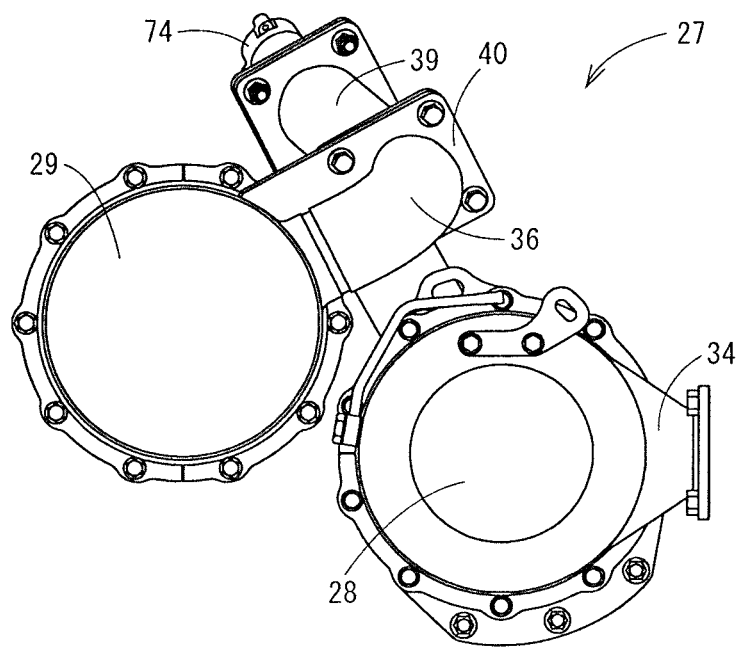
FIG. 21 is a right side view of the exhaust gas purifier.
Figure 22:
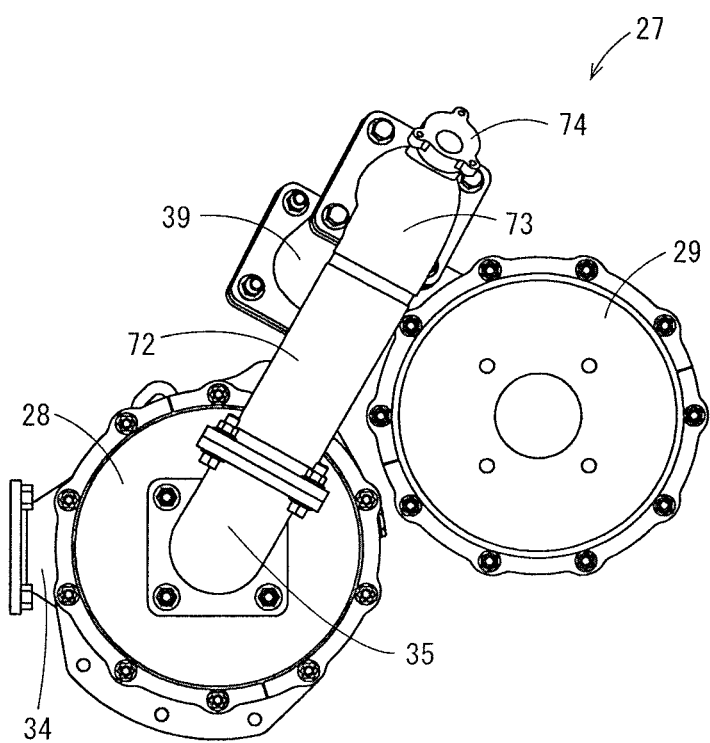
FIG. 22 is a left side view of the exhaust gas purifier.
Figure 23:
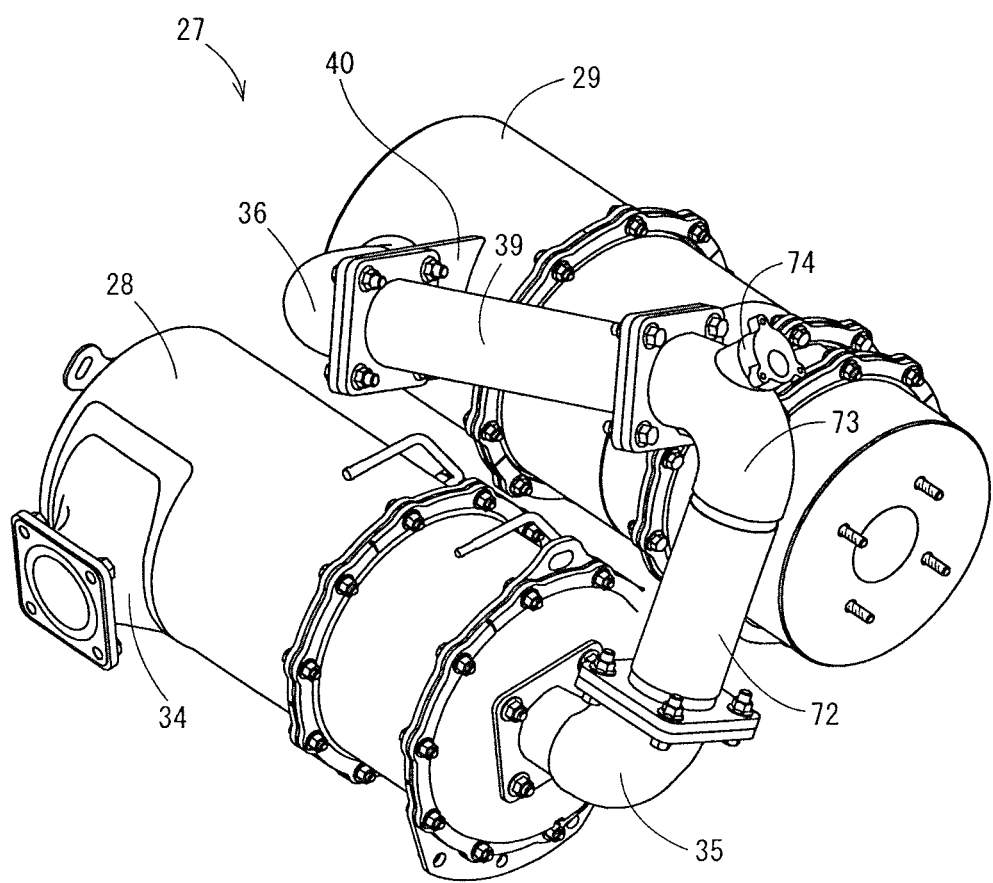
FIG. 23 is a perspective view of the exhaust gas purifier.

With reference to FIGS. 1, 3, 8 and 11, a structure for discharging exhaust gas of the diesel engine 1 is described. As shown in FIGS. 1, 3 and 11, an exhaust gas outlet tube 70 of the supercharger 38 is connected to one end of a gas discharge tube 71 made of flexible heat resistant rubber, and the DPF inlet tube 34 is connected to the other end of the gas discharge tube 71, so that the supercharger 38 is communicated to the first case 28 via the gas discharge tube 71. Thus, the exhaust gas in the exhaust manifold 6 is permitted to move from the supercharger 38 to the first case 28.

In addition, the DPF outlet tube 35 is connected to one end of a metal discharge tube 72, a urea mixing tube 73 is disposed integrally to the other end of the discharge tube 72, one end of the connection pipe 39 is connected to the exhaust gas outlet side of the urea mixing tube 73, and the other end of the connection pipe 39 is connected to the SCR inlet tube 36. In other words, the DPF outlet tube 35 is connected to the SCR inlet tube 36 via the discharge tube 72, the urea mixing tube 73, and the connection pipe 39 so that the first case 28 is communicated to the second case 29. Thus, the exhaust gas is permitted to move from the first case 28 to the second case 29.

As shown in FIGS. 1, 8 and 9, there are disposed a urea water tank 75 for storing urea water, a urea water injection nozzle 76 for supplying urea, and a urea water injection pump 77 for pressure-sending the urea water in the urea water tank 75 to the urea water injection nozzle 76. The urea water tank 75 is disposed in the bonnet 55. The urea water injection pump 77 is disposed in the traveling mission device 61 and is driven by the output of the diesel engine 1. The urea water injection nozzle 76 is disposed at a nozzle support 74 of the urea mixing tube 73.

With the structure described above, the urea water in the urea water tank. 75 is sent by pressure from the urea water injection pump 77 to the urea water injection nozzle 76 so that the urea water is injected from the urea water injection nozzle 76 into the urea mixing tube 73. Thus, the urea water from the urea water injection nozzle 76 is mixed into the exhaust gas from the diesel engine 1 inside the urea mixing tube 73 or the connection pipe 39. The exhaust gas mixed with the urea water passes through the second case 29 (the SCR catalyst 32 and the oxidation catalyst 33) so that nitrogen oxide (NOx) in the exhaust gas is reduced and is discharged from the SCR outlet tube 37 to the outside.

Next, with reference to FIGS. 1 to 3 and 10 to 23, a structure for attaching the exhaust gas purifier 27 is described. There are disposed a first support leg 81 for supporting the DPF inlet tube 34 side of the first case 28 and a second support leg 82 for supporting the DPF outlet tube 35 side of the first case 28. A lower end side of the first support leg 81 is fastened with bolts 83 to a side surface on which the exhaust manifold 6 is disposed among side surfaces of the cylinder head 2, and the first support leg 81 is disposed to stand on one side surface of the cylinder head 2. The DPF inlet tube 34 side of the first case 28 is fastened to the upper end side of the first support leg 81 with a fastening band 86 in an attachable and detachable manner.

In addition, the lower end side of the second support leg 82 is fastened with bolts 84 and 85 to the side surface on which the intake manifold 3 is disposed and the side surface on which the cooling water pump 21 is disposed among the sides of the cylinder head 2, so that the second support leg 82 is disposed to stand on the other side surface of the cylinder head 2. The DPF outlet tube 35 side of the first case 28 is fastened to the upper end side of the second support leg 82 with fastening bolts 87 in an attachable and detachable manner. In other words, the first support leg 81 and the second support leg 82 are disposed to stand on the opposed side surfaces of the cylinder head 2 so as to support the first case 28 in such a manner to bridge over the cylinder head 2.

A longitudinal direction of the cylindrical first case 28 (the exhaust gas moving direction) corresponds to the horizontal lateral direction crossing the engine output shaft 4.

On the other hand, as shown in FIGS. 1, 2, 8 and 9, a radiator 90 is disposed so as to face the cooling fan 24. A machine frame 91 is disposed to stand on the upper surface side of the traveling machine body 56. The machine frame 91 supports the radiator 90 and a wind tunnel plate 92. The wind tunnel plate 92 covers the cooling fan 24, and the cooling fan 24 intakes external air through the radiator 90 so that the cooling fan 24 supplies cooling air to each portion of the diesel engine 1, while the cooling water is circulated to each portion of the diesel engine 1 and to the radiator 90 by the cooling water pump 21 so that the diesel engine 1 is cooled.

In addition, as shown in FIGS. 1 and 2, a SCR support leg 93 protrudes from the second case 29 toward the lower surface side, and the lower end side of the SCR support leg 93 is fastened to the machine frame 91 with bolts 94 in an attachable and detachable manner. The second case 29 is positioned substantially just above the cooling fan 24. The wind tunnel plate 92 as a shroud is disposed between the upper surface side of the cooling fan 24 and the lower surface side of the second case 29. The upper end portions of the first support leg 81 and the second support leg 82 are disposed higher than the uppermost end portion of the wind tunnel plate 92, and the first case 28 is supported at a higher position than the uppermost end portion of the wind tunnel plate 92, while the second case 29 is supported at a higher position than the first case 28 via the machine frame 91 and the SCR support leg 93.

In the upper surface side of the diesel engine 1, the first case 28 and the second case 29 are disposed in parallel on the upper surface side on which the cooling fan 24 is disposed, and the exhaust gas connection pipe 39 extends diagonally above the opposed side surfaces of the first case 28 and the second case 29. The exhaust gas connection pipe 39 has a length longer than the width of the first case 28 and the second case 29 on an exhaust gas moving side, so as to secure a sufficient exhaust gas moving distance in the exhaust gas connection pipe 39 that is necessary for mixing the urea water. In addition, the first case 28 and the second case 29 are disposed higher than the air flow path of the cooling fan 24 for the diesel engine 1 formed by the wind tunnel plate 92, and the second case 29 is disposed higher than the first case 28. In other words, the first case 28 and the second case 29 are disposed higher than the upper surface of the wind tunnel plate 92 (cooling fan shroud) of the diesel engine 1, and the second case 29 is disposed just above the cooling fan 24.

Accordingly, by an engine cooling air guiding action of the first support leg 81 and the second support leg 82 as the case brackets, the cooling air from the cooling fan 24 is guided to move to the upper surface side of the diesel engine 1. Furthermore, as shown in FIG. 1, it is possible to dispose a cooling air guiding body 95 between the first case 28 and the wind tunnel plate 92, so that the cooling air from the cooling fan 24 is guided by the cooling air guiding body 95 to move from the wind tunnel plate 92 side to the upper surface side of the diesel engine 1.

As shown in FIGS. 1 to 4 and 10 to 23, the engine device includes the first case 28 for removing particulate matter in the exhaust gas of the diesel engine 1, and the second case 29 for removing nitrogen oxide in the exhaust gas of the diesel engine 1. The first case 28 and the second case 29 are disposed on the upper surface side of the diesel engine 1 at a position higher than the air flow path (wind tunnel plate 92) of the cooling fan 24 for the diesel engine 1. The second case 29 is disposed at a position higher than the first case 28. Accordingly, it is possible to easily reduce a decrease of temperature of the first case 28 and the second case 29 due to the cooling air (from the cooling fan 24) for the diesel engine 1. In addition, by setting different heights of supporting the cylindrical first case 28 and second case 29, a distance between the main body of the first case 28 and the main body of the second case 29 (installation width of the cases 28 and 29 in a plan view) can be easily reduced, and hence the first case 28 and the second case 29 can be disposed closely to each other in a compact manner. The first case 28 and the second case 29 can be connected to the exhaust gas outlet of the exhaust manifold 6 of the diesel engine 1 by a close distance, and hence urea crystallization or the like in the second case 29 can be reduced.

As shown in FIGS. 1 to 4 and 10 to 23, the second case 29 is disposed at a position higher than the uppermost surface portion of the wind tunnel plate 92 as the cooling fan shroud for the diesel engine 1, and the second case 29 is disposed substantially just above the cooling fan 24 via the wind tunnel plate 92. Accordingly, the wind tunnel plate 92 is disposed between the cooling fan 24 and the second case 29, and the second case 29 can be disposed away from the cooling air path of the cooling fan 24 for supplying the cooling air to the diesel engine 1. The cooling air can be supplied from the lower side of the first case 28 to the upper surface side of the diesel engine 1, and a decrease of temperature of the first case 28 and the second case 29 can be suppressed, while the first case 28 and the second case 29 can be disposed in a compact manner biased to the upper surface on which the cooling fan 24 is disposed in the upper surface of the diesel engine 1, so as to be in the left and right direction crossing the engine output shaft 4.

As shown in FIGS. 1 to 4 and 10 to 23, the first support leg 81 and the second support leg 82 as the case brackets are disposed to stand on the opposed surfaces of both sides of the cylinder head 2 toward the upper surface side of the diesel engine 1, and the first case 28 is attached to the first support leg 81 and the second support leg 82 and is supported in the position to cross the diesel engine 1 (in the left and right direction crossing the engine output shaft 4). In this structure, by the engine cooling air guiding action of the first support leg 81 and the second support leg 82 disposed like a gate on the lower surface side of the first case 28, the cooling air is guided to move from the cooling fan 24 to the upper surface side of the diesel engine 1. Accordingly, the cooling air is supplied from the cooling fan 24 to the upper surface side of the diesel engine 1 through between the lower surface of the first case 28 and the first support leg 81 as well as the second support leg 82, so that the cooling air from the cooling fan 24 can appropriately cool the upper surface side of the diesel engine 1. Thus, overheating (output loss) or the like of the diesel engine 1 can be reduced, and the first case 28 and the second case 29 can be disposed in a compact manner biased to the upper surface on which the cooling fan 24 is disposed in the upper surface of the diesel engine 1, while a decrease of temperature of the cases 28 and 29 due to the cooling air from the cooling fan 24 can be easily suppressed.

As shown in FIGS. 1 to 4, a water cooling radiator 90 is disposed to face the front side of the cooling fan 24, and the first case 28 is attached to the upper surface side of the diesel engine 1. In this case, the second case 29 is supported on the machine frame 91 side on which the radiator 90 or the wind tunnel plate 92 is disposed. Accordingly, the first case 28 and the second case 29 can be disposed in a compact manner biased to the upper surface on which the cooling fan 24 and the radiator 90 are disposed in the upper surface of the diesel engine 1, while the attaching/detaching operation of the first case 28 or the attaching/detaching operation of the second case 29 to the upper surface of the diesel engine 1 can be performed independently or integrally, and workability of assembling or disassembling the cases 28 and 29 having large weights necessitating a suspending operation by a loading mechanism such as a hoist or a chain block can be improved.

EXPLANATION OF NUMERALS 1 diesel engine
24 cooling fan
28 first case
29 second case
81 first support leg (case bracket)
82 second support leg (case bracket)
90 radiator
91 machine frame
92 wind tunnel plate (cooling fan shroud)

The invention claimed is:

1. An engine device comprising:
a first case for removing particulate matter in exhaust gas of an engine,
a second case for removing nitrogen oxide in the exhaust gas of the engine,
and a cooling fan for providing cooling air to said engine,
the first case and the second case being disposed on an upper surface side of the engine,
a machine body frame configured to mount the engine and supporting a cooling fan shroud covering the cooling fan,
wherein the first case and the second case are disposed at a position higher than an air flow path of the cooling fan, and the second case is disposed at a position higher than the first case,
the second case is supported by the machine body frame, and is disposed at a position higher than an upper surface of the cooling fan shroud, and also above the cooling fan,
and the first case is supported by a case bracket disposed to stand on a cylinder head of the engine.

2. The engine device according to claim 1, further comprising, as case brackets, a first supporting leg and a second supporting leg disposed separately on two opposing sides of the cylinder head perpendicular to the side of the cylinder head opposite the cooling fan,
and wherein one longitudinal end side of the first case is affixed to the first supporting leg, and the other side is affixed to the second supporting leg.

3. The engine device according to claim 1, comprising, as case brackets, a first supporting leg and a second supporting leg disposed separately on two opposing sides of the cylinder head perpendicular to the side of the cylinder head opposite the cooling fan,
and wherein the first supporting leg and the second supporting leg are positioned on an upper surface side of the cylinder head and proximate to the cooling fan and are configured to provide an engine cooling air guiding function for guiding cooling airflow from the cooling fan to the upper surface side of the engine.

4. The engine device according to claim 1, wherein a radiator is disposed in front of the cooling fan.

* * * * *